US007844836B1

(12) United States Patent
Weaver et al.

(10) Patent No.: US 7,844,836 B1
(45) Date of Patent: Nov. 30, 2010

(54) METHOD AND APPARATUS FOR USING AN IC TO FACILITATE DOWNLOADING CONTENT

(75) Inventors: David John Weaver, Noblesville, IN (US); Richard Allen Norman, Indianapolis, IN (US); Thomas Patrick Newberry, Westfield, IN (US)

(73) Assignee: Thomson Licensing, Boulogne Billancourt (FR)

( * ) Notice: Subject to any disclaimer, the term of this patent is extended or adjusted under 35 U.S.C. 154(b) by 1552 days.

(21) Appl. No.: 10/030,601

(22) PCT Filed: Jul. 13, 2000

(86) PCT No.: PCT/US00/18894

§ 371 (c)(1),
(2), (4) Date: Jan. 9, 2002

(87) PCT Pub. No.: WO01/06469

PCT Pub. Date: Jan. 25, 2001

Related U.S. Application Data

(60) Provisional application No. 60/143,842, filed on Jul. 15, 1999.

(51) Int. Cl.
*G06F 11/30* (2006.01)
(52) U.S. Cl. .................. 713/194; 713/189; 726/26; 726/27; 726/30
(58) Field of Classification Search .............. 713/193, 713/191
See application file for complete search history.

(56) References Cited

U.S. PATENT DOCUMENTS

| 6,055,314 | A  | * | 4/2000  | Spies et al. ........... 380/228 |
| 6,233,683 | B1 | * | 5/2001  | Chan et al. ........... 713/172 |
| 6,460,076 | B1 | * | 10/2002 | Srinivasan ............ 709/219 |
| 6,950,941 | B1 | * | 9/2005  | Lee et al. ............. 713/193 |

FOREIGN PATENT DOCUMENTS

| EP | 788080      | 8/1997  |
| EP | 915410      | 5/1999  |
| WO | 97/19395    | 5/1997  |
| WO | WO 97/19395 | 5/1997  |
| WO | 98/43430    | 10/1998 |
| WO | WO 98/43430 | 10/1998 |
| WO | 99/12088    | 3/1999  |
| WO | WO 99/12088 | 3/1999  |

\* cited by examiner

*Primary Examiner*—Pramila Parthasarathy
(74) *Attorney, Agent, or Firm*—Robert D. Shedd; Paul P. Kiel

(57) ABSTRACT

A method and apparatus for using an integrated circuit card to facilitate downloading reusable content from a server into a terminal. Specifically, the method comprises the steps of verifying that an entitlement contained in the integrated circuit card is correct for receiving the reusable content from the server and downloading the reusable content from the server into a memory of the terminal. The apparatus comprises a terminal, coupled to a remote server and an integrated circuit card, coupled to the terminal via the interface circuit, for enabling the server to download the reusable content in the terminal. The terminal comprises a processor for processing the download of the content from the server, a memory for receiving the downloaded content and an integrated circuit card interface circuit.

15 Claims, 2 Drawing Sheets

METHOD AND APPARATUS FOR USING AN IC TO FACILITATE DOWNLOADING CONTENT

This application claims the benefit under 35 U.S.C. §365 of International Application PCT/US00/18894, filed Jul. 13, 2000, which was published in accordance with PCT Article 21(2) on Jan. 25, 2001 in English; and which claims benefit of U.S. provisional application Ser. No. 60/143,842 filed Jul. 15, 1999.

FIELD OF THE INVENTION

The invention generally relates to electronic data transfer. More particularly, the invention relates to a method and apparatus for using an integrated circuit card to facilitate downloading user reusable content from a remote server.

BACKGROUND OF THE DISCLOSURE

Software piracy or the illegal copying of software applications is a common problem. After a customer purchases a software application on a set of disks or CD-ROM, the customer may provide the source disks or CD-ROM to another individual. If this other individual copies the software application into their computer, the software publisher is denied a potential sale.

To exacerbate the software piracy problem, computer networks, such as broadcast networks, enhance the transfer of information between a local terminal and a remote site. These networks enable millions of users to watch cable television or use the Internet to communicate with other users and the like. Such a broadcast network facilitates software and other content distribution via the network. However, authorizing downloads of the content is not a simple task in a broadcast network having a large number of users.

Therefore, there is a need to provide a method and apparatus to provide a secure technique to market and distribute software applications in a broadcast network environment.

SUMMARY OF THE INVENTION

The invention overcomes the disadvantages associated with the prior art by providing a method and apparatus that uses an integrated circuit card to facilitate downloading reusable content maintained on a server into a terminal. Such reusable content includes any data file, multimedia information, application software, and the like that can be stored by a user and reused by the user. The term or the usability of the content may be limited or unlimited.

Specifically, the method comprises the steps of verifying that an entitlement contained in the integrated circuit card, such as a smart card, is correct for receiving specific reusable content from a server and, if the entitlement is correct, downloading the content from the server into a memory within the terminal.

The apparatus comprises a terminal coupled to a remote server, via a communications network. The terminal comprises a processor for processing the download of the specific reusable content from the server, a memory for storing the downloaded content, a smart card and an interface circuit for enabling the server to download a particular content into the terminal when an appropriate smart card is inserted into the interface.

BRIEF DESCRIPTION OF THE DRAWINGS

To facilitate understanding, identical reference numerals have been used, where possible, to designate identical elements that are common to the figures.

DETAILED DESCRIPTION

Figure 1:
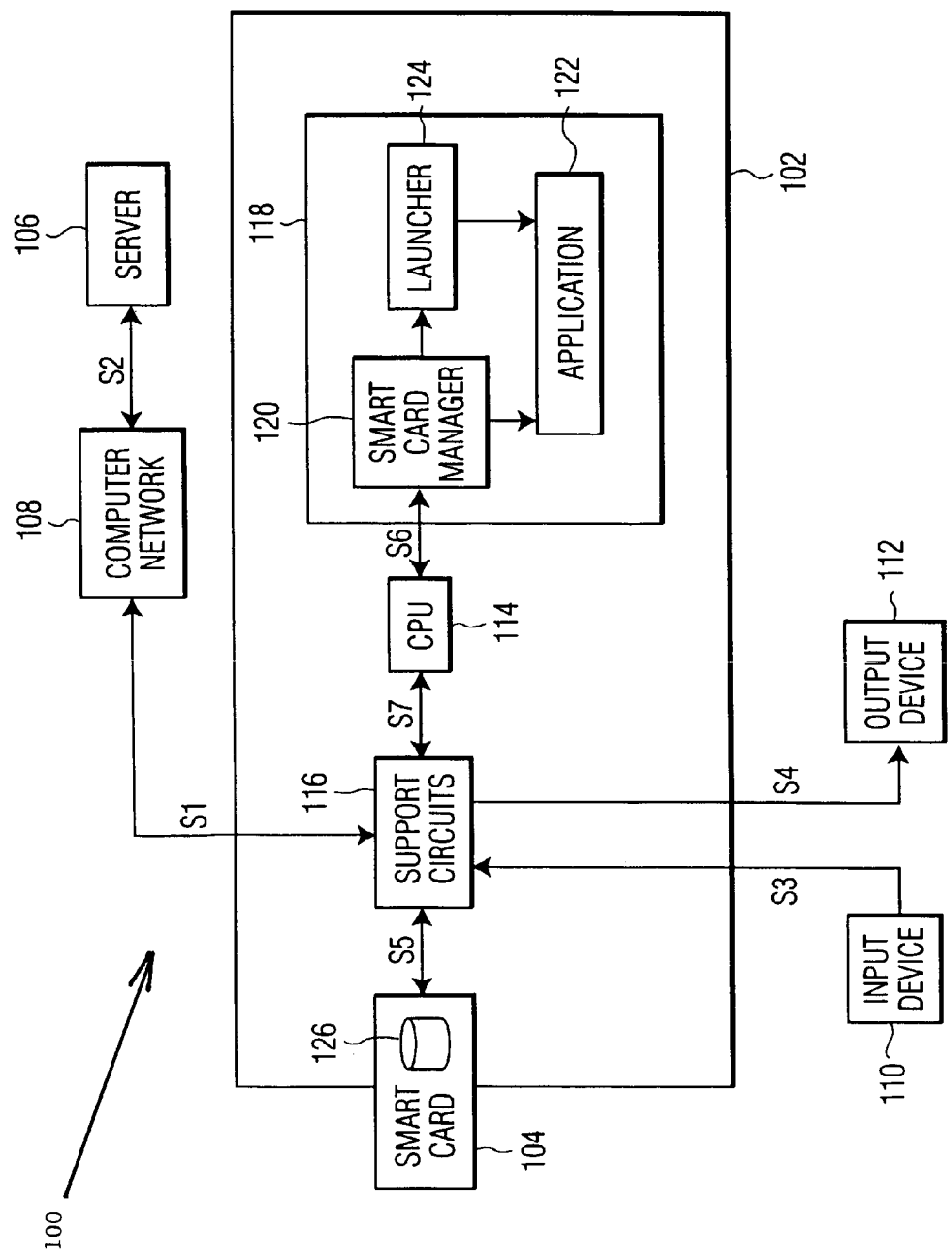
FIG. 1 depicts a high-level block diagram of a system for providing secure reusable content downloads.

FIG. 1 depicts a high-level block diagram of a system 100 using an integrated circuit card 104 (for example, a smart card) for providing secure reusable content downloads from a server 106. The system 100 comprises at least a terminal 102, a smart card 104, a remote server 106, a computer network 108, an input device 110 and an output device 112. The smart card 104 and its interface generally comply with ISO standard 7816. However, this invention may be successfully practiced with "smart cards" complying to other standards.

The system 100 may have two general embodiments depending on the type of computer network 108 that is utilized. In a first embodiment, the computer network 108 comprises a point-to-point network such that the terminal 102 receives specific user content that is addressed to the terminal 102 from the remote server 106. In a second embodiment, the computer network 108 comprises a broadcast network such that the terminal 102 receives software or reusable content that is simultaneously transmitted to a plurality of terminals from the remote server 106. A user of either embodiment may download software or other reusable content from the remote server 106. The software or reusable content may be encrypted or unencrypted. Additionally, the reusable content includes any data file, multimedia information, and the like that is stored and reused by the user. The content may be reused in either a limited or unlimited manner.

The terminal 102 generally comprises a central processing unit (CPU) 114, support circuits 116 and a memory 118. The terminal 102 may comprise a set-top terminal (also commonly referred to as a set-top box), a computer terminal or any other device capable of receiving a smart card 104 or another equivalent conditional access device that facilitates conditional access to the reusable content that is available on the network. Each of these types of terminals 102 may be utilized in the broadcast or point-to-point network 108.

The terminal 102 is coupled to the remote server 106 via the network 108. More specifically, the terminal 102 is coupled to the network 108 via signal path S1 and the network 108 is coupled to the server 106 via signal path S2. The network 108 is typically a broadcast network or a point-to-point network depending on the embodiment of the system 100. The server 108 is the source of software applications or other reusable content that are available for downloading.

The physical implementations of signal paths S1 and S2 include but are not limited to telephone lines, coaxial (coax) cable, optical fibers or a hybrid fiber-coax cable system. In addition, various interface devices may couple the terminal 102 to the network 108 along signal path S1. Examples of these interface devices may include but are not limited to a digital subscriber line (DSL) modem, a cable modem, a satellite receiver, a microwave receiver, a wireless modem and a cable tuner. As such, the system 100 transmit data and control signals between the terminal 102 and the network 108 via signal path S1 as well as between the network 108 and the server 106 via signal path S2.

The terminal 102 is coupled to an input device 110 via signal path S3 and an output device 112 via signal path S4. The type of input and output devices 110 and 112 depend on the embodiment of the system 102. For example, if the terminal 102 is a computer terminal, then the input device 110 may comprise a keyboard and mouse, and the output device 112 may comprise a computer monitor. If the terminal 102 is a set top terminal, then the input device 110 may comprise a channel selector or a remote control device, and the output device 112 may comprise a television set. Signal paths S3 and S4, which are physically implemented with basic television or computer cables, carry control and data signals between the terminal 102 and input device 110 as well as between the terminal 102 and the output device 112.

The terminal 102 receives the smart card 104 via a connector in the support circuit 116. On a data transfer level, the support circuit 116 couples the smart card 104 via signal path S5. The smart card 104 includes a database 126 or memory for storing entitlements. The entitlements, typically known as "entitlement management messages" (EMM), are associated with particular downloadable software applications or other reusable content. Each entitlement represents a future right to download a software application or other reusable content into the terminal 102. Alternatively, each entitlement may represent a right to decrypt and/or use previously encrypted software or reusable content transmitted over a broadcast network 108. As such, these entitlements provide security in the marketing and distribution of software applications from the remote server 106.

Entitlements generally occupy less of the database 126 than its corresponding software application or other reusable server content, each smart card 104 may store many different entitlements. The entitlements are loaded into the smart card 104 prior to downloading the corresponding application 122 or other reusable content. For example, the smart card 104 may contain pre-loaded entitlements that are included with the purchase of the smart card 104. Alternatively, the smart card 104 is a blank smart card. In this case, the user must download the entitlement from the remote server 106 during the on-line purchase of the corresponding application 122 or other reusable content using a single smart card 104. This provides enormous flexibility, as the user may potentially download hundreds of software applications or other reusable server content using a single smart card 104.

Different types of entitlements are contemplated to be within the scope of the invention. One type of entitlement facilitates a limited use of software or reusable content. For example, the entitlement may expire once the software is used a pre-determined number of times or after a period of time, for example, 24 hours. Another type of entitlement facilitates an unlimited license to the use of the downloaded content. In this case, there is no use restriction once the application 124 is downloaded into the terminal 102. Other types of entitlements and applications thereof are contemplated and are considered to be within the scope of the invention.

The CPU 114 generally processes the data and control signals of the terminal 102. As such, the CPU 114 processes data and control signals between the memory 118, the remote server 108, the smart card 104, the input device 110 and the output device 112. The exact type of CPU 114 depends on the embodiment of the system 100. The CPU 114 couples the memory 118 via signal path S6 and couples the support circuits 116 via signal path S7. Signal paths S6 and S7, which may comprise data and control signals, are bidirectional as signals travel between the CPU 114 and the memory 118 as well as between the CPU 114 and the support circuit 116.

The support circuits 116, also known as an interface circuit, interfaces the CPU 114 with the smart card 104, the input device 110, the output device 112 and the remote server 106. The support circuit 116 generally comprises a variety of components, including a data bus, a control bus, a smart card drive, a network interface module, input ports and output ports. The support circuit 116 generally provides efficient transfer of data and control signals between the smart card 104, the terminal 102 and the remote server 106.

The memory 118 stores a variety of software modules in the terminal 102. The memory may comprise a RAM, a ROM or a combination thereof. The software modules may include a smart card manager 120, an application program 122 and an application launcher 124. Other well-known software modules, such as an operating system, are included but not shown in FIG. 1.

The smart card manager 120 coordinates software downloads from the remote server 106 to the memory 118. More importantly, the smart card manager 120 processes the "entitlements" from the smart card 104. The entitlement allows a user to download the software application 122 or other reusable content from the server 106 or to decrypt the previously-encrypted software application 122. The smart card manager 120 generally processes the entitlement information in the database 126 within the smart card 104 in order to determine whether the terminal 102 is authorized to download a specific application from the server 106. In addition, the smart card manager 120 may coordinate the download of entitlements during the on-line purchase of a corresponding software application 124 or other reusable content.

The smart card manager 120 may process the decryption of the previously encrypted software application 122. The smart card manager 120 may decrypt the software application 122 "on the fly," while downloading the application 122 into the memory 118. In this situation, any user may download the encrypted application 122 via the broadcast network 108 but only users having the entitlement may decrypt and use the decrypted application 122. Alternatively, the smart card manager 120 may decrypt the application 122 after previously downloading the encrypted version into the memory 118. In this case, the smart card manager 120 may decrypt and use the application 122 until all the entitlements in the database 126 for a particular application 122 are exhausted.

The application 122 is the particular software program or other reusable server content downloaded from the remote server 106. The application 122 may comprise but is not limited to software applications, such as word processing, banking, credit, and stock trading, or broadcast videos such as a movie. Once downloaded, the application 122 is typically stored in the memory 118. The application 122 includes any data file, multimedia information, software, and the like that can be stored and reused by the user. The term or usability of the application 122 may be limited or unlimited.

The application launcher 124 executes or starts the application 122. The application launcher 124 may link with the smart card manager 120 to determine the validity of the application software 122, which may be encrypted or otherwise protected. Variations of the application launcher 124 may exist as the user may initiate the application launcher 124 using an icon displayed on the output device 112 or the smart card manager 120 may initiate the application launcher 124.

Figure 2:
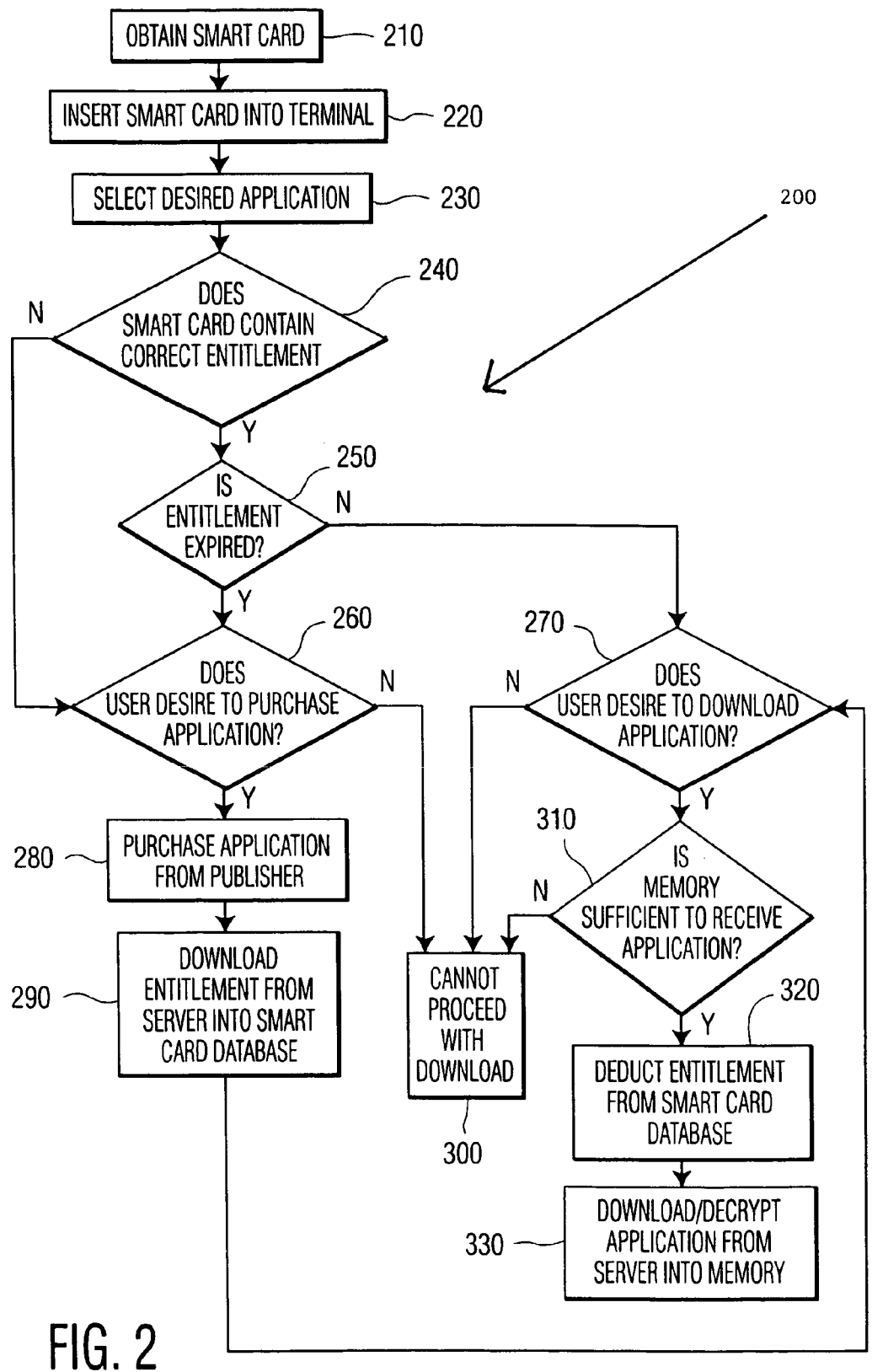
FIG. 2 depicts a flow chart of a routine for downloading reusable content using the system of FIG. 1.

FIG. 2 is a flow diagram of a routine 200 for downloading software or some other reusable server content using the system 100 of FIG. 1. The routine 200 represents the operation of the system 100 and starts with the user obtaining a smart card 104 at step 210. The user may obtain this smart card 104 through a retail purchase or through a service provider.

The smart card 104 comprises a database 126 for receiving and storing entitlements associated with various software applications 122 or other reusable server content. Each entitlement or entitlement management message (EMM) is unique to a particular application 122 or reusable content that the system 100 may download. The entitlement may provide the user with permission to download the application 122 or reusable content from the remote server 106. Alternatively, the entitlement may allow the user to decrypt the previously encrypted application 122 or reusable content transmitted from the server 106 via the broadcast network 108.

One variation of the smart card 104 may comprise a "blank" smart card 104 that may receive entitlements to a software application 122 or other reusable content. The entitlements are downloaded into the smart card 104 from the remote server 106. Another variation of the smart card 104 may include pre-loaded entitlements of specific software applications or other reusable content.

At step 220 of the routine 200, the user inserts the smart card 104 into the terminal 102. This step assumes that the user has already activated the terminal 102 and coupled this terminal 102 to the remote server 106 via the network 108 or Internet connection. As such, this step 220 couples the smart card 104 to the remote server 106 via the terminal 102 and the network 108.

The routine 200 proceeds to step 230 where the user selects a particular application 122 to purchase or download. The user may purchase the application 122 or other reusable content using a blank or preloaded smart card 104. If the blank or preloaded smart card 104 does not presently contain the correct entitlement of the application 122, the user must purchase the application 122 or other reusable content before obtaining the correct entitlement associated with the application 122 or other reusable content. If the smart card 104 contains the correct entitlement associated with the application 122, the user may download the application 122 or other reusable content from the remote server 106.

At step 240 of the routine 200, the smart card manager 120 reads the database 126 within the smart card 104 to determine whether the smart card 104 contains the correct entitlement associated with the desired application 122 or content. If the smart card 104 contains the entitlement for the application 122, then the routine 200 proceeds to step 250. This may occur if the smart card 104 is pre-loaded with the entitlement for the desired application 122 or reusable content. However, if the smart card 104 does not contain the entitlement of the application 122, then the routine 200 proceeds to step 260. As such, the routine 200 proceeds to step 260 if the smart card 104 is blank or does not contain the entitlement for the desired application 122.

At step 250, the smart card manager 120 determines whether the entitlement is expired. Such an expiration date may exist in a trial or shareware version of a software application or a video that is available during a particular month. If the reusable content is video, the entitlement may limit viewing of the video during a particular period. If the entitlement is expired, then the routine 200 proceeds to step 260. If the entitlement is not expired or still active, then the routine 200 proceeds to step 270, where the user may download the application 122.

Therefore, if the entitlement in database 126 is not for the desired application 122 or reusable content, or if the entitlement is expired or no longer active, then the routine 200 requires the user to purchase the application 122 or reusable content at step 260. However, if this entitlement is for the desired application 122 or reusable content, and is active, then the routine 200 allows the user to download the desired application 122 or reusable content at step 270.

At step 260, the routine 200 determines whether the user wishes to purchase the application 122. This message is generally displayed to the user on the output device 112. If the user decides to purchase the application 122 or other content, the routine 200 proceeds to step 280. If the user decides not to purchase the application 122 or other reusable content, the routine 200 proceeds to step 300, where the user may no longer obtain the entitlement for the application 122.

At step 280, the user purchases the application 122 using, for example, a credit card or some other payment method. Then, the routine 200 proceeds to step 290, where the user downloads the entitlement from the server 106 into the database of the smart card 104. After the entitlement is downloaded into the smart card 104, the routine 200 proceeds to step 270 to determine whether the user desires the download the application 122.

If the user decides to download the application 122, the routine 200 proceeds to step 310. If the user decides against downloading the application 122, the routine 200 proceeds to step 300, where the server 104 will no longer download the application 122 into the memory 118 of the terminal 102.

At step 310, the routine 200 generally determines whether the memory 118 in the terminal 102 is sufficient to receive the application 122 or other reusable content. If the memory 118 is sufficient to receive the application 122, the routine 200 proceeds to step 320. However, if there is not enough memory 118 to store or receive the application 122, then the routine 200 proceeds to step 300, and the user may not download the application 122.

At step 320, the smart card manager 120 deducts the entitlement from the database 126 of the smart card 104. The nature of this deduction depends on the type of entitlement. In the case of a typical software download, the smart card manager 120 simply deducts the entitlement for the application 122. However, if the system 100 involves viewing video a particular number of times, then the smart card manager adjusts the entitlement to reflect the current usage. As such, the smart card manager 120 may fully or partially deduct the entitlement. After this step 320, the routine 200 proceeds to step 330, where the smart card manager 120 processes the download of the application 122 or other reusable content from the server 106 into the memory 118 of the terminal 102. If the application 122 is in encrypted form, then the smart card manager 120 may decrypt the application 122 during download into memory 118.

After completing the routine 200, the user may use or view the application 122 or other reusable content. The user activates the application launcher 124, which starts or executes the application 122. The user may select an icon on the output device 112 to activate this application launcher 124. Alternatively, the smart card manager 120 may automatically start the application launcher 124.

Although various embodiments, which incorporate the teachings of the present invention have been shown and described in detail herein, those skilled in the art may readily devise many other varied embodiments that still incorporate these teachings.

The invention claimed is:

1. A method for using an integrated circuit card to facilitate downloading and use of content from a server to a terminal, the method comprising the steps of:

receiving the integrated circuit card into the terminal;

receiving via the terminal an input selecting content provided from the server;

verifying that an entitlement, which represents a future right to download and use the selected content, and is contained in the integrated circuit card is correct for receiving the selected content;

receiving the selected content from the server via the terminal in response to the verification;

storing the selected content in a memory of the terminal that is separate and spaced apart from the integrated circuit card; and verifying that the entitlement is correct for reuse of the selected content when reuse of the selected content is attempted.

2. The method of claim 1 wherein the selected content is a software application.

3. The method of claim 1 wherein the selected content includes video content.

4. The method of claim 1 wherein the integrated circuit card contains pre-loaded entitlements authorizing said reuse of the selected content.

5. The method of claim 1 wherein the entitlement is downloaded into the integrated circuit card from the server.

6. The method of claim 1, wherein a part of the selected content provided from the server is encrypted, and further comprising the step of:

decrypting the encrypted part of the selected content provided from the server as a function of the entitlement when one of use and reuse of the selected content is attempted.

7. The method of claim 1 further comprising the step of:

updating an entitlement database on said integrated circuit card after the entitlement is used to download said selected content.

8. The method of claim 1 wherein said verifying step further comprises the steps of downloading the entitlement; and storing the entitlement into said integrated circuit card.

9. An apparatus for securely downloading, and using content from a server, the apparatus comprising:

a processor for processing the download of the content from the server, a memory for receiving and storing the downloaded content, and an interface circuit for receiving an integrated circuit card;

wherein the integrated circuit card is separate and spaced apart from the memory;

wherein the integrated circuit card provides an entitlement message, representing a future right to download and use the selected content, and enabling said apparatus to download the content from the server, the integrated circuit card containing an entitlement database for storing a plurality of entitlement messages each associated with a particular content; and wherein the integrated circuit card provides the entitlement message enabling said apparatus to reuse the content after being downloaded from the server and stored in the memory.

10. The apparatus of claim 9, wherein the processor is adapted to transfer entitlement messages received from the server to the integrated circuit card.

11. The apparatus of claim 9, wherein the downloaded content is encrypted, and further comprising a decryption module for decrypting the downloaded content in response to the entitlement message stored on the integrated circuit card.

12. An apparatus for downloading and reusing content from a server, the apparatus comprising:

a receiver communicatively coupled to the server and adapted to receive reusable content from the server;

an integrated card interface adapted to receive an integrated circuit card;

a memory that is separate and spaced apart from the integrated circuit card;

a processor coupled to the receiver, the integrated card interface, and the memory, the processor enabling the reusable content from the server to be received and stored in the memory in response to entitlement information, which represents a future right to download and use the selected content, received from the integrated circuit card via the integrated card interface, the processor enabling reuse of the reusable content stored in the memory in response to the entitlement information received from the integrated circuit card via the integrated card interface.

13. The apparatus of claim 12, wherein the reusable content is encrypted, and further comprising:

a decryption module, coupled to the memory, and adapted to decrypt the reusable content in response to the entitlement information received from the integrated circuit card via the integrated card interface.

14. The apparatus of claim 12, wherein the reusable content comprises one of a software application and video content.

15. The apparatus of claim 14, wherein the processor is adapted to cause new entitlement information received via the receiver to be transmitted to the integrated circuit card via the integrated card interface.

* * * * *